Figure 1:
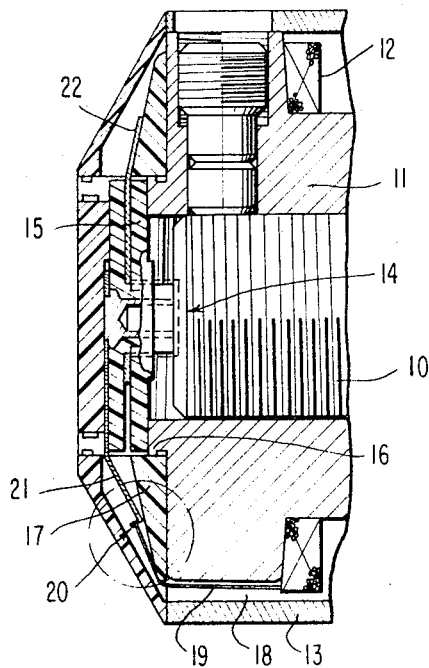

United States Patent [19]
Burckhardt et al.

[11] 3,745,390
[45] July 10, 1973

[54] FREQUENCY TRANSMITTER ESPECIALLY FOR BRAKE SLIPPAGE CONTROL SYSTEMS OF MOTOR VEHICLES

[75] Inventors: Manfred H. Burckhardt, Waiblingen; Walter Lütze, Esslingen; Paul Schwerdt, Esslingen-Hegensberg, all of Germany

[73] Assignee: Daimler-Benz Aktiengesellschaft, Stuttgart-Unterturkheim, Germany

[22] Filed: Sept. 16, 1971

[21] Appl. No.: 181,005

[30] Foreign Application Priority Data

July 14, 1971 Germany............G 70 34 511.8

[52] U.S. Cl. .................................................. 310/71
[51] Int. Cl. ......................................... H02k 11/00
[58] Field of Search.................. 310/71, 67, 168, 310/169, 170, 171, 176; 339/275 B, 275 T, 276 A

[56] References Cited
UNITED STATES PATENTS

| | | | |
|---|---|---|---|
| 3,631,275 | 12/1971 | Conrad | 310/71 |
| 3,458,741 | 7/1969 | Woodward | 310/168 |
| 3,596,122 | 7/1971 | Stewart | 310/168 |
| 3,555,319 | 1/1971 | Schaefer | 310/71 |

FOREIGN PATENTS OR APPLICATIONS

| | | | |
|---|---|---|---|
| 957,752 | 5/1964 | Great Britain | 310/71 |
| 960,833 | 3/1957 | Germany | 310/71 |
| 191,982 | 2/1956 | Austria | 310/71 |
| 1,613,222 | 8/1970 | Germany | 310/71 |
| 1,128,022 | 4/1962 | Germany | 310/71 |
| 206,778 | 7/1955 | Australia | 310/71 |

OTHER PUBLICATIONS

Lawrence, "Electronics World," 12/1959, p.p. 54 & 55.

Primary Examiner—R. Skudy
Attorney—Craig, Antonelli and Hill

[57] ABSTRACT

A frequency transmitter producing pulses at a high repetition rate for determining the rotary behavior of wheels, especially for brake slippage control installations of motor vehicles, in which a non-rotating part cooperates with a rotating part by means of teeth, and in which a coil producing a magnetic field is arranged in the non-rotating part; whose ends are connected with connecting terminals, for example, plug contacts; the ends of the coil are lead out of the coil to connecting lugs of the contacts, bypassing a considerable intermediate space, and are connected with these lugs whereby the connecting lugs themselves are also extended out of the contacts to the places where the actual connections take place, so that the connecting places for the coil ends are relieved from tensional loads and stresses.

10 Claims, 2 Drawing Figures

PATENTED JUL 10 1973  3,745,390

INVENTORS
MANFRED H. BURCKHARDT
WALTER LÜTZE
PAUL SCHWERDT

BY Craig, Antonelli & Hill
ATTORNEYS

FREQUENCY TRANSMITTER ESPECIALLY FOR BRAKE SLIPPAGE CONTROL SYSTEMS OF MOTOR VEHICLES

The present invention relates to a frequency transmitter producing a high number of pulses for the determination of the rotary behavior of wheels, especially for brake slippage control installations of motor vehicles, whereby a non-rotating part cooperates with a rotating part by means of a toothed arrangement or the like and a coil producing a magnetic field is arranged in the non-rotating part whose ends are connected with the connecting elements, for example, with plug contacts.

With frequency transmitters of the aforementioned type, the manufacture of the coil and above all the connection of the coil ends with the contact elements entails considerable difficulties in the manufacture. The coil assembly takes place as a rule manually so that errors are unavoidable as a result thereof. Additionally, the winding especially in the application thereof in a motor vehicle axle, is subjected to considerable accelerations which are caused by the movements of the axle during spring deflections.

The present invention is concerned with the task to avoid the aforementioned difficulties. Consequently, a coil is to be provided which can be manufactured easily and above all the connections of the winding ends with the contact places should be able to satisfy all requirements and should be able to withstand all loads and stresses.

The underlying problems are solved according to the present invention with the frequency transmitters of the type described hereinabove in that the ends of the coil are extended out of the same and in bypassing a considerable intermediate space are led to the connecting lugs of the contacts and are connected with the same, and in that the connecting lugs themselves are also led out of the contacts and are extended up to the respective connection place.

The construction according to the present invention entails the advantage that the connecting places are relieved from tensional loads and stresses. The stresses due to the aforementioned accelerations are absorbed by the portions inserted between the actual connecting places and the winding or contacts, respectively. Consequently, it is not necessary to insert at the winding ends particularly strong wires as was frequently necessary heretofore. The manufacture of the entire coil inclusive its connecting places is thereby also considerably simplified and rendered less costly in the assembly.

Generally in the construction according to the present invention, the lugs of the contact elements and the wire ends will run toward one another unidirectionally, i.e., in the same direction. However, the present invention prefers a construction according to which the ends of the connecting lugs are bent at an angle to the arriving wire of the coil ends and the latter are slung several times about these bent ends and are then secured at the same. The present invention thereby contemplates a looping of about two to four turns. The fastening then takes place appropriately by soldering.

A frequency transmitter is known in the prior art in which an annular coil is mounted approximately at one end of an essentially cylindrical base body, while a coaxial plug is arranged centrally at the other end thereof as connecting element. For such an arrangement the present invention proposes that one or several axial grooves accessible from the outside are provided in the base body, through which the coil ends are led toward the plug.

A further feature of the present invention resides in that a conical plastic bush, for example, made of suitable synthetic resinous material is mounted on an annular extension at the base body at the end opposite the coil, which bush inwardly thereof surrounds the plug body as tightly as possible and externally extends to the bottom of the axial groove or grooves. A good electrical insulation of the connecting places from the base body is assured in this manner. It is then additionally proposed according to the present invention that the disk made from plastic material is rounded off at its outer edge as viewed in cross section. An abrading of the wire at the edge of the base body is avoided thereby.

It is further proposed according to the present invention that the connecting lugs are extended radially out of the plug body and are bent off in the direction toward the conical disk member. One lug may thereby abut directly at the conical disk member, i.e., may have the same inclination as the latter. The other lug is then inclined correspondingly more strongly toward the conical disk member.

Accordingly, it is an object of the present invention to provide a frequency transmitter producing a high pulse number, especially for brake slippage control installations of motor vehicles, which avoids by simple means the aforementioned shortcomings and drawbacks encountered in the prior art.

Another object of the present invention resides in a frequency transmitter producing a high number of pulses per rotation, especially for brake slippage control installations of motor vehicles, which facilitates the manufacture of the coil and the connection of the coil ends with the contact parts.

A further object of the present invention resides in a frequency transmitter of the type described above which can be readily manufactured and assembled and minimizes the danger of short-circuits due to abrasion or wear of wire insulation.

A still further object of the present invention resides in a frequency transmitter with high pulse number, especially for brake slippage control installations of motor vehicles which effectively relieves the wires and connections thereof from tensional stresses and obviates the need for heavy connecting wires.

Figure 2:
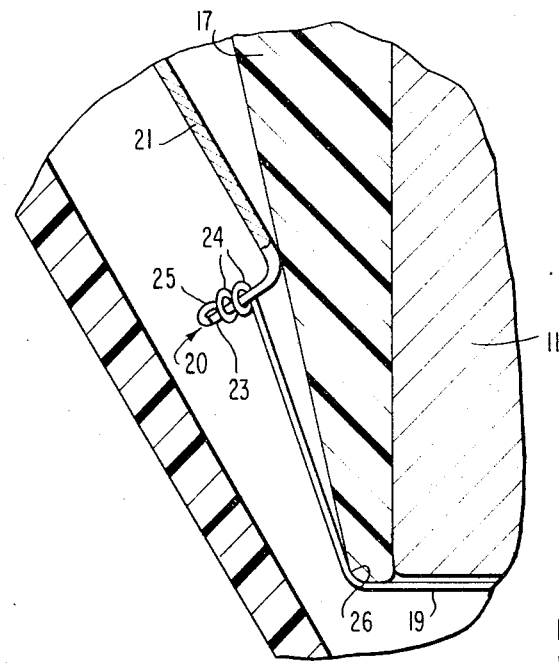

These and further objects, features and advantages of the present invention will become more apparent from the following description when taken in conjunction with the accompanying drawing which shows, for purposes of illustration only, one embodiment in accordance with the present invention, and wherein FIG. 1 is a partial axial cross sectional view through the base body of a frequency transmitter in accordance with the present invention, and FIG. 2 is a partial cross sectional view, on an enlarged scale, of the details encircled in dash and dot lines in FIG. 1.

Referring now to the drawing wherein like reference numerals are used throughout the two views to designate like parts, according to FIGS. 1 and 2 a base body 11 is non-rotatably mounted and secured in a conventional manner on the non-rotating axle stub 1. of a motor vehicle axle. The base body 11 may consist of magnetizable material. It carries approximately at one end an annular coil 12. The rotating part (not shown in the drawing) which is arranged adjacent the annular coil 12, cooperates in a manner known as such, by means of teeth with the teeth of the pole shoe 13 mounted on the base body 11. Since the arrangement described so far is known as such in the art, a further showing thereof is dispensed with herein.

At the other end of the base body 11, a coaxial plug generally designated by reference numeral 14 is centrally provided whose plug body made of synthetic resinous material or the like abuts with a disk portion 15 at the end face of the base body 11. A conical disk-like member 17 is mounted on an annular extension 16 of the base body 11, which surrounds with the inner circumference the disk portion 15 of the coaxial plug 14 forming a shoulder as tightly as possible. This conical disk-like member 17 extends outwardly up to the bottom of one or several axial grooves 18 which are provided externally in the base body 11. These grooves 18 are accessible from the outside since the pole shoe 13 is installed only after the manufacture and assembly of the winding 12 on the base body 11.

The wire ends 19 of the coil 12 are guided through the described axial grooves 18 toward the opposite side relative to the coil 12. The wire ends 19 may thereby extend in the same axial groove 18 or also in two mutually offset axial grooves. The ends of the wires 19 are connected at the connecting places generally designated by reference numeral 20 with lugs 21 and 22, respectively, of the contacts, i.e., preferably are soldered thereto. These lugs 21 and 22 are extended radially out of the disk portion 15 of the coaxial plug 14 and up to the respective connecting place 20. They are thereby bent at the outer edge of the disk portion 15 in the direction toward the conical disk-like member 17. The lug 22 can thereby abut directly at the conical disk-like member 17 whereas the lug 21 has a somewhat more pronounced bend.

According to FIG. 2 the end of the lug 21—and the same applies to lug 22—is bent off approximately at right angle. The end of the wire 19 is wrapped about this end 23 bent off at right angle with several turns, for example, with two or three turns 24. The wire end 25 is then soldered to the end of the bent off portion 23 of the lug 21 (or 22). The wire 19 follows a rounded off portion 26 of the conical disk-like member 17 so that it cannot be worn through at its insulation. The conical disk-like member 17 appropriately consists of synthetic resinous material of any suitable known type having electrical insulating properties.

Each connecting place 20 is relieved from tension in the described manner. It is prevented thereby that the wire breaks at the connection 20. Any stresses due to relative movements between the winding 12 and the connecting parts (lugs 21 and 22) are absorbed by the wire sections extending in the axial grooves 18 or by the turns 24 and/or the wire sections disposed therebetween. The conical disk-like member 17 additionally prevents an abutment of each connecting place 20 at the base body 11 so that a safe insulation is attained thereby.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. In a brake slippage control installation for motor vehicles, a frequency transmitter arrangement for producing electrical pulses indicating the rotary behavior of vehicle wheels including a non-rotating part mounted on an axle stub, a rotating part cooperating with said non-rotating part and a coil arranged in said non-rotating part for producing a magnetic field, the improvement comprising connecting means for effecting connection to said coil, a coaxial plug centrally arranged with respect to the end of said axle stub for supporting said connecting means and lug means extending radially outward from said coaxial plug for effecting connection of the coil ends to said connecting means, said coil ends extending out of said coil through at least one axial groove in said non-rotating part to said lug means for connection therewith.

2. A frequency transmitter according to claim 1, characterized in that the connecting means are contact terminals.

3. A frequency transmitter according to claim 1, characterized in that the connecting means are plug contacts.

4. A frequency transmitter according to claim 1, characterized in that the ends of the connecting lug means are bent off at an angle to the arriving wire of the coil ends, and in that the wire of a coil end is slung several times about the corresponding bent off end and is then secured thereon.

5. A frequency transmitter according to claim 1, characterized in that several axial grooves are provided in the base body for the wire ends of the coil.

6. A frequency transmitter according to claim 1, characterized in that a substantially conical disk is mounted on an extension of the non-rotating part at the end opposite the coil, said disk inwardly thereof tightly surrounding the coaxial plug body and outwardly thereof extending up to the bottom of the grooves.

7. A frequency transmitter according to claim 6, characterized in that the disk essentially consists of synthetic resinous material with insulating properties.

8. A frequency transmitter according to claim 6, characterized in that the conical disk is rounded off at its outer edge, as viewed in cross section.

9. A frequency transmitter according to claim 8, characterized in that the connecting lug means are extended radially out of the coaxial plug body and are bent in the direction toward the conical disk.

10. A frequency transmitter according to claim 1, characterized in that the connecting lug means are extended radially out of the coaxial plug body and are bent in the direction toward the conical disk.

* * * * *